United States Patent

[11] 3,573,802

[72] Inventors: Masao Kawashima;
Shigehiko Hinoshita; Shunroku Sasaki, Yokohama-shi; Shoichi Kurita, Kawasaki-shi, Japan
[21] Appl. No.: 804,801
[22] Filed: Mar. 6, 1969
[45] Patented: Apr. 6, 1971
[73] Assignee: Fujitsu Limited
Kawasaki, Japan
[32] Priority: Mar. 9, 1968
[33] Japan
[31] 43-15294

[54] BIPOLAR ANALOG-TO-DIGITAL FEEDBACK ENCODER UTILIZING A REVERSIBLE SHIFT REGISTER
7 Claims, 14 Drawing Figs.

[52] U.S. Cl. .................................................. 340/347, 179/15.55
[51] Int. Cl. .................................................. H03k 13/00
[50] Field of Search .................................................. 340/347; 324/98, 99; 179/15, 15.55; 325/38

[56] References Cited
UNITED STATES PATENTS
| | | | |
|---|---|---|---|
| 3,296,612 | 1/1967 | Tomozawa | 325/38X |
| 3,354,452 | 11/1967 | Bard et al. | 340/347 |
| 3,414,818 | 12/1968 | Reidel | 340/347X |

Primary Examiner—Maynard R. Wilbur
Assistant Examiner—Charles D. Miller
Attorneys—Curt M. Avery, Arthur E. Wilfond, Herbert L. Lerner and Daniel J. Tick ABSTRACT: In a nonlinear coder, a weighing resistance network for linear encoding is controlled in accordance with the nonlinear characteristic by selection of the weighing resistance via a reversible shift register.

FIG. 8
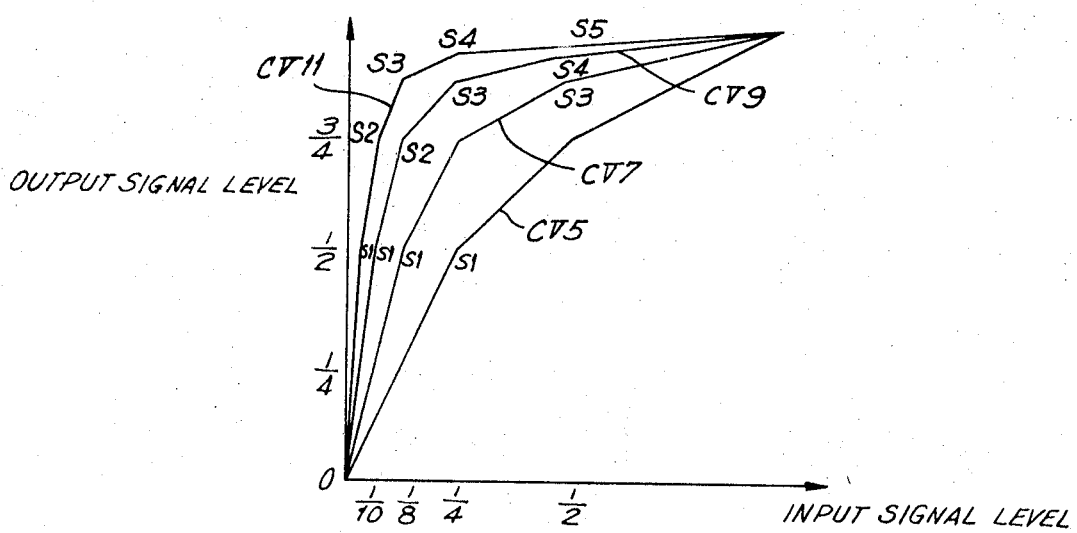
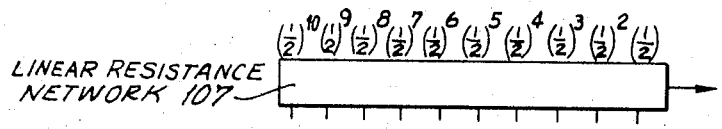
FIG. 9a
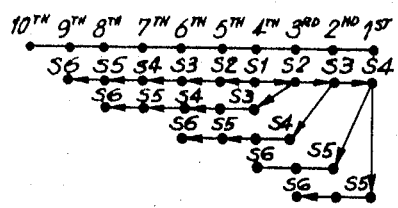
FIG. 9b
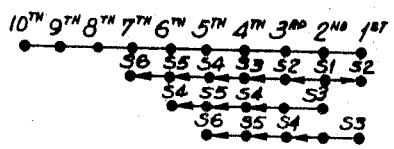
FIG. 9c

ތ3,573,802

BIPOLAR ANALOG-TO-DIGITAL FEEDBACK ENCODER UTILIZING A REVERSIBLE SHIFT REGISTER

DESCRIPTION OF THE INVENTION

The present invention relates to a nonlinear coder or encoder. More particularly, the invention relates to a nonlinear coder for piecewise linear compression encoding of input signals.

In a PCM communication system, various analog signals are sampled at a sampling frequency greater than a multiple of the signal band of the analog signals. The sampled analog signals are quantized and coded and are then transmitted via a transmission line as PCM signals. Generally, coded or encoded PCM signals have various amplitude distributions, so that in order to effectively quantize the analog amplitude in a specific number of codes, it is necessary to allot a number of codes to the region where the amplitude distribution of the analog amplification magnitude is dense. It is also necessary to allot the remaining codes to the region where the amplitude distribution is sparse. This is the principal of the nonlinear coder. Nonlinear encoding is achieved by various methods. The most widely used method utilizes a diode compandor and expands the input signals in advance. The signals are then encoded by a linear encoder, thereby accomplishing compression coding. In a piecewise linear encoding method, the coder itself exhibits a nonlinear characteristic.

The principal object of the present invention is to provide a new and improved nonlinear encoder or coder.

An object of the present invention is to provide a nonlinear coder for piecewise linear compression encoding of input signals.

An object of the present invention is to provide a nonlinear coder which functions with efficiency, effectiveness and reliability.

An object of the present invention is to provide a nonlinear coder which is of simple structure.

An object of the present invention is to provide a nonlinear coder which provides a compandor function via a simple linear resistance network.

An object of the present invention is to provide a nonlinear coder which provides logarithmic or hyperbolic type polygonal line compression via a simple circuit structure and with considerable facility.

An object of the present invention is to provide a nonlinear coder which permits free variation of the polygonal line characteristics with facility.

In accordance with the present invention, a nonlinear coder for piecewise linear compression encoding of input signals comprises an input for providing input signals. A sign discriminating circuit connected to the input determines the sign of the input signals. A full wave rectifier connected to the input rectifies the input signals. A network provides a comparison level signal. Gate and memory components connected to the network drive the network. The network and the rectifier are coupled to a comparing circuit and supply the rectified signals and the comparison level signal to the comparing circuit. The comparing circuit compares the level of the rectified signals with the comparison level. A control circuit connected to the comparing circuit provides a control signal in accordance with the output of the comparing circuit. A reversible shift register is connected between the control circuit and the gate and memory components for controlling the gate and memory components in accordance with the control signal. An output coupled to the sign discriminating circuit and the comparing circuit provides an output pulse.

The sign discriminating circuit comprises a first comparator and the comparing circuit comprises a second comparator. The network comprises a linear resistance network. The output comprises a pair of AND gates. One of the AND gates has an input connected to the comparing circuit and another input coupled to the sign discriminating circuit via the other of the AND gates.

The control circuit controls the reversible shift register for logarithmic compression or for hyperbolic compression.

In order that the present invention may be readily carried into effect, it will now be described with reference to the accompanying drawings, wherein.

Figure 3:
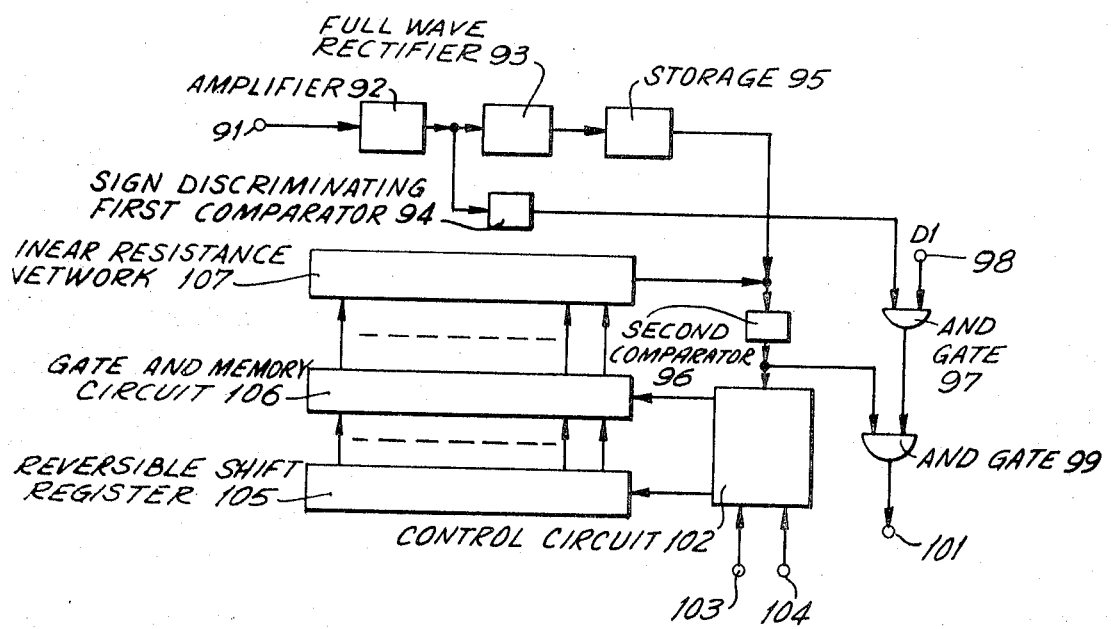
FIG. 3 is a block diagram of an embodiment of the nonlinear coder of the present invention.
Figure 5A:
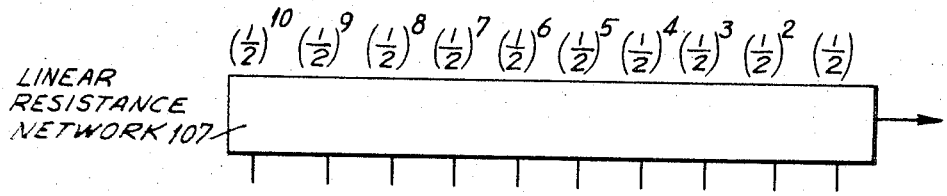
Figure 5B:
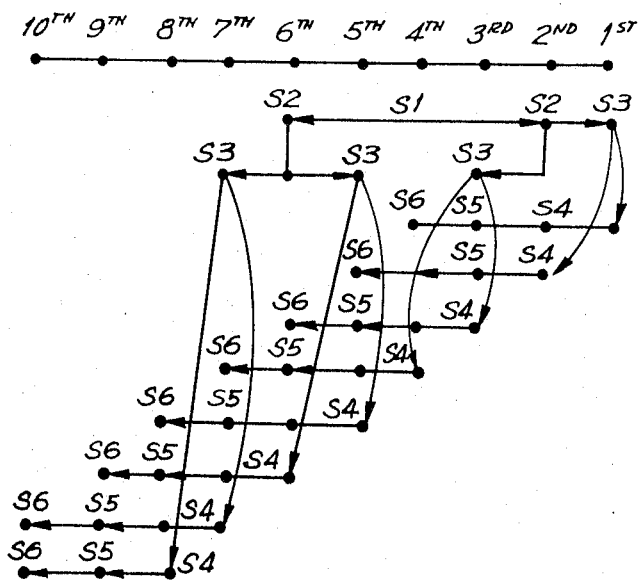
Figure 5C:
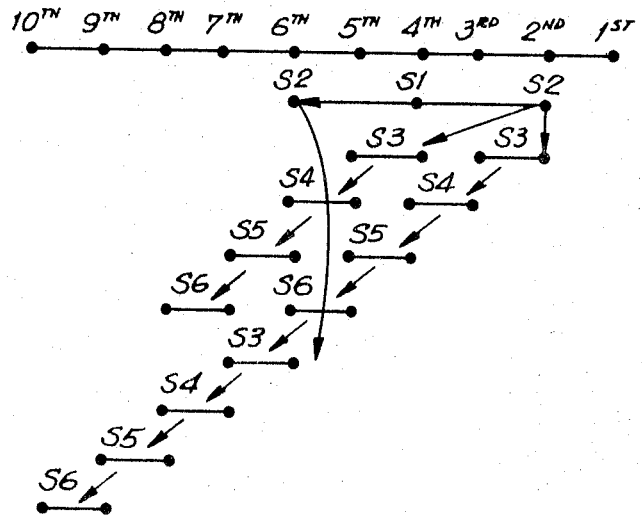
Figure 6:
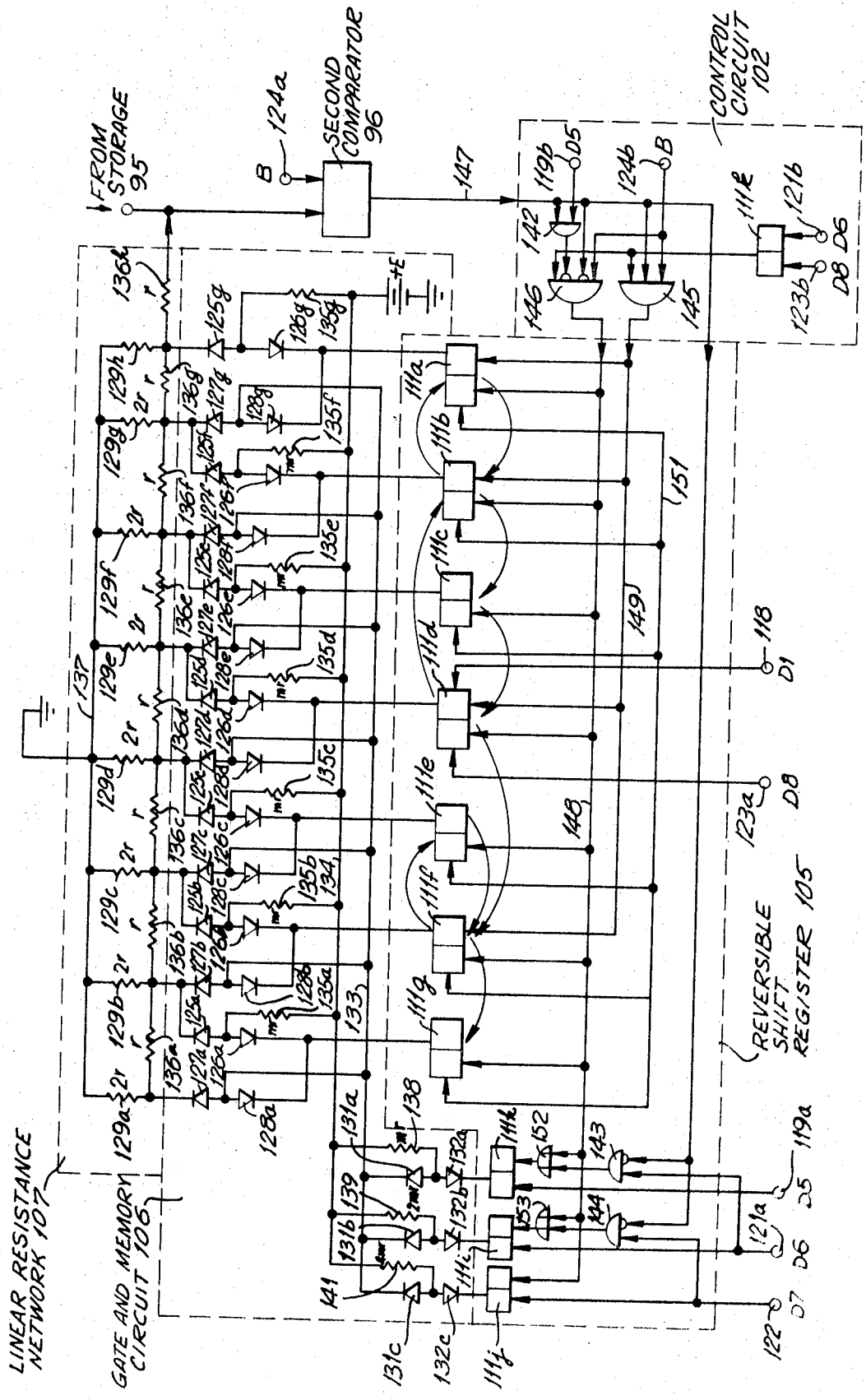
Figure 7:
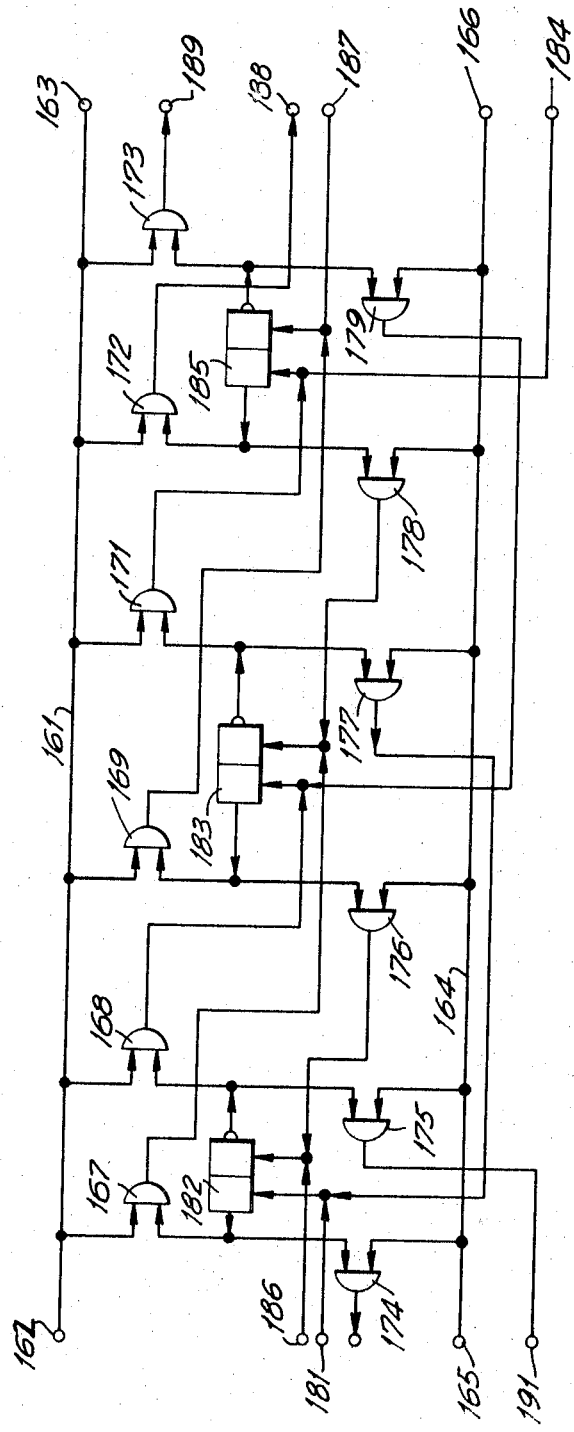
Figure 10:
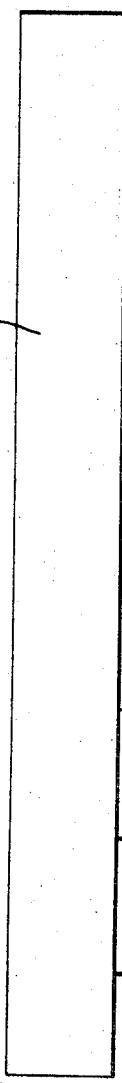

FIGS. 5a, 5b, and 5c are diagrams illustrating the operation of the nonlinear coder of the present invention;

FIG. 6 is a circuit diagram of the embodiment of FIG. 3 of the nonlinear coder of the present invention;

FIG. 7 is a circuit diagram of a reversible shift register which may be utilized as the reversible shift register 105 of FIG. 3;

FIG. FIG. 8 is a graphical presentation illustrating another companding characteristic of the nonlinear coder of the present invention;

FIGS. 9a, 9b, and 9c are diagrams illustrating the operation of the nonlinear coder of the present invention; and FIG. 10 is a block and circuit diagram of a modification of the nonlinear coder of FIG. 3.

In the FIGS., the same components are identified by the same reference numerals.

Figures 1, 2:
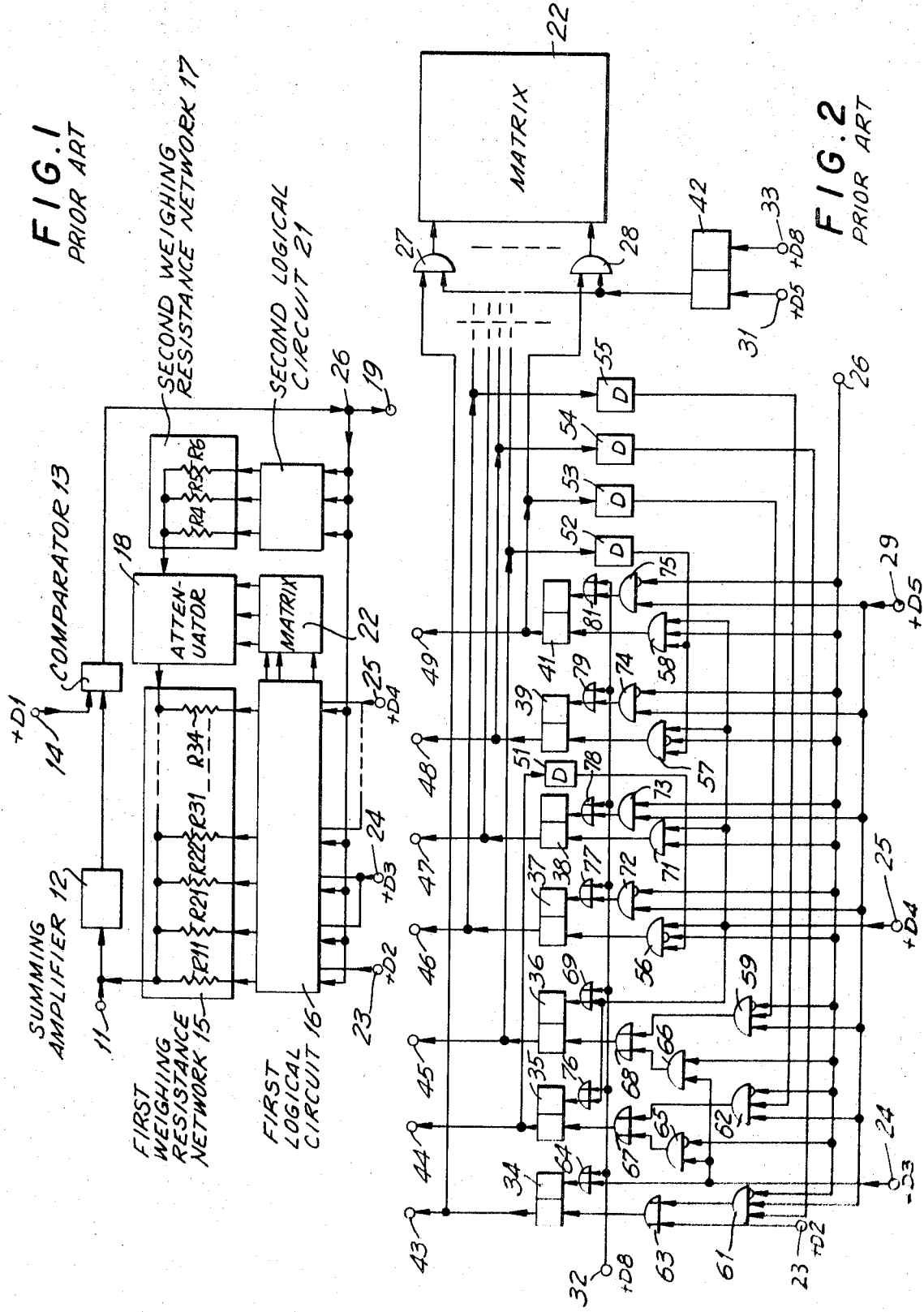
FIG. 1 is a block diagram of an embodiment of a known piecewise linear coder.
FIG. 2 is a circuit diagram of a logical circuit which may be utilized as the logical circuit of the coder of FIG. 2.
Figure 4:
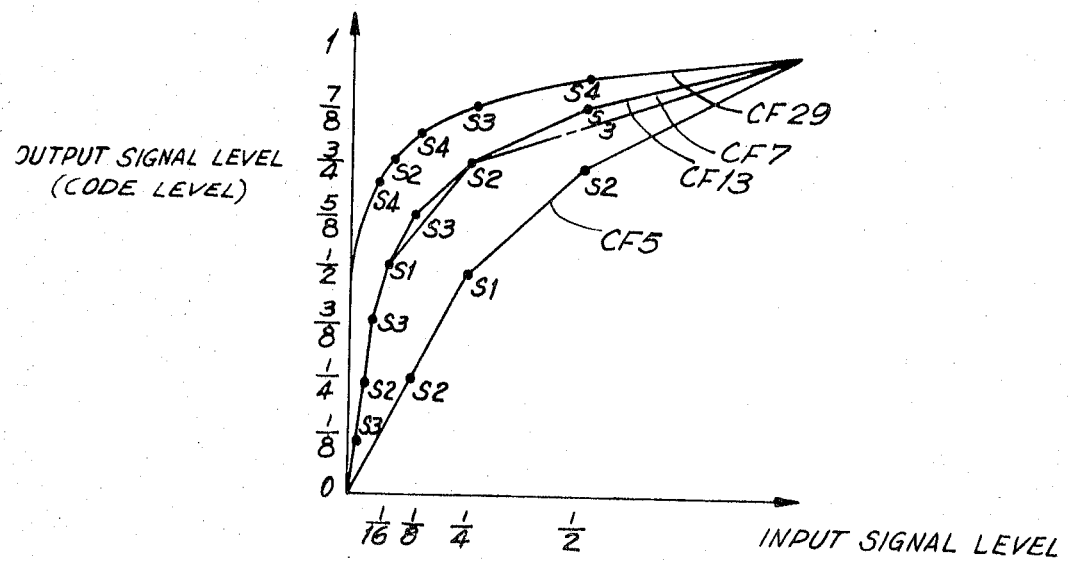
FIG. 4 is a graphical presentation illustrating the companding characteristic of the coder of the present invention.

FIG. 1 illustrates a conventional piecewise linear coder which may provide nonlinear coding of a 13 piece linear characteristic, as shown by CF13 of FIG. 4. In FIG. 1, an input terminal 11 is connected to the input of a summing amplifier 12. The output of the summing amplifier 12 is connected to the input of a comparator 13. An input terminal 14 is also connected to the input of the comparator 13.

A first weighing resistance network 15 functions to determine break points. The first weighing resistance network 15 is connected to the outputs of a first logical circuit 16 and to the outputs of a second weighing resistance network 17 via an attenuator 18. The first logical circuit 16 also functions to determine break points. The second weighing resistance network 17 functions to divide each linear region.

The second weighing resistance network 17 is connected to an input terminal 26 via a second logical circuit 21 which functions to divide the linear region. The input terminal 26 is directly connected to the output of the comparator 13. An output terminal 19 is connected to the input terminal 26 and provides the output signal of the nonlinear encoder. The output of the comparator 13 is connected to the input of the summing amplifier 12 via a first feedback path which comprises the first logical circuit 16 and the first weighing resistance network 15 and a second feedback path which comprises the second logical circuit 21, the second weighing resistance network 17, the attenuator 18 and the first weighing resistance network 15. The attenuator 18 is connected to the outputs of the first logical circuit 16 via a matrix 22.

The nonlinear coder of FIG. 1 codes or encodes a single analog signal into eight bits. The first bit is utilized to discriminate or determine the signs or polarities of the signals. The second, third, fourth and fifth bits are utilized to determine the break points. The sixth, seventh and eighth bits are utilized for dividing the linear region. The first bit is not shown in FIG. 1. However, the signs of the signals are discriminated or determined and pulses provided in accordance with such determinations. The pulses or signals provided in accordance with the signs or polarities of the input signals are rectified and the magnitudes of the rectified signals are stored in a storage circuit. The output of the storage circuit is supplied to the input terminal 11 of FIG. 1. This circuitry is not illustrated in FIG. 1 in order to maintain the clarity of illustration.

In the second, third, fourth and fifth bits, the second weighing resistance network 17 and the second logical circuit 21 for dividing the linear region are not operated. The first weighing resistance network 15 and the first logical circuit 16 for determining the break points, however, are operated. At such time, or in such bits, the resistance value of the first weighing resistance network 15 is determined in order to enable nonlinear encoding. As seen in FIG. 2, the break points are determined by complex logical operation.

In the sixth, seventh and eighth bits the break points or break point levels determined in the second, third, fourth and fifth bits, are stored in the attenuator 18 and the matrix 22. Linear encoding is provided by the second weighing resistance network 17 and the second logical circuit 21 for dividing the linear region. Each of the first and second resistance networks 15 and 17 and the first and second logical circuits 16 and 21 may comprise any suitable known circuit. A timing pulse D1 is supplied via the input terminal 14 and timing pulses D2, D3, D4 are supplied via input terminals 23, 24 and 25, respectively.

FIG. 2 is a circuit diagram of a logical circuit which may be utilized as the first logical circuit 16 of FIG. 1. In FIG. 2, the timing pulses D2, D3, D4 are supplied via the input terminals 23, 24 and 25. An output terminal 26 is connected to the output terminal 19 of FIG. 1. The outputs of a plurality of AND gates 27... 28 are connected to the matrix 22. Timing or clock pulses D5 are supplied via input terminals 29 and 31 and timing or clock pulses D8 are supplied via input terminals 32 and 33.

A plurality of flip-flops 34, 35, 36, 37, 38, 39, 41 and 42 are provided. The input terminal 31 is connected to an input of the flip-flop 42 and the input terminal 33 is connected to another input of said flip-flop. The output of the flip-flop 42 is connected to an input of each of the AND gates 27... 28. The output of each of the flip-flops 34, 35, 36, 37, 38, 39 and 41 is connected to the other input of a corresponding one each of the AND gates 27...28. The outputs of the flip-flops 34, 35, 36, 37, 38, 39 and 41 are connected to output terminals 43, 44, 45, 46, 47, 48 and 49, respectively, which output terminals are connected to the first weighing resistance network 15.

A plurality of one bit delay circuits 51, 52, 53, 54 and 55 are connected between the outputs of corresponding ones of the flip-flops and corresponding AND gates and inhibit gates. Thus, the delay circuit 51 is connected between the output of the flip-flop 35 and an input of an inhibit gate 56. The delay circuit 52 is connected between the output of the flip-flop 36 and an input of an inhibit gate 57 as well as an input of an AND gate 58. The delay circuit 53 is connected between the output of the flip-flop 41 and an input of an inhibit gate 59. The delay circuit 54 is connected between the output of the flip-flop 39 and an input of an inhibit gate 61. The delay circuit 55 is connected between the output of the flip-flop 37 and an input of an inhibit gate 62.

The input terminal 23 is connected to an input of an OR gate 63. The output of the inhibit gate 61 is connected to the other input of the OR gate 63. The output of the OR gate 63 is connected to an input of the flip-flop 34. The input terminal 24 is connected to an input of an OR gate 64, to an input of an inhibit gate 65 and to an input of an AND gate 66. The output of the OR gate 64 is connected to the other input of the flip-flop 34. The output of the inhibit gate 65 is connected to an input of an OR gate 67. The output of the inhibit gate 62 is connected to the other input of the OR gate 67. The output of the OR gate 67 is connected to an input of the flip-flop 35.

The output of the AND gate 66 is connected to an input of an OR gate 68. The output of the inhibit gate 59 is connected to the other input of the OR gate 68. The output of the OR gate 68 is connected to an input of the flip-flop 36. The input terminal 25 is connected in common to another input of the inhibit gate 56, an input of an OR gate 69, an input of an AND gate 71, another input of the inhibit gate 57 and another input of the AND gate 58. The output of the inhibit gate 56 is connected to an input of the flip-flop 37. The output of the AND gate 71 is connected to an input of the flip-flop 38. The output of the inhibit gate 57 is connected to an input of the flip-flop 39. The output of the AND gate 58 is connected to an input of the flip-flop 41.

The input terminal 29 is connected in common to another input of the inhibit gate 61, another input of the inhibit gate 62, another input of the inhibit gate 59, an input of an inhibit gate 72, an input of an AND gate 73, an input of an inhibit gate 74, and an input of an inhibit gate 75. The input terminal 26 is connected in common to the third input of the inhibitor 61, the other input of the inhibitor 65, the third input of the inhibitor 62, the other input of the AND gate 66, the third input of the inhibit gate 59, the third input of the inhibit gate 56, the other input of the inhibit gate 72, the other input of the AND gate 71, the other input of the AND gate 73, the third input of the inhibit gate 57, the other input of the inhibit gate 74, the third input of the AND gate 58 and the other input of the inhibit gate 75.

The input terminal 32 is connected in common to the other input of the OR gate 64, an input of an OR gate 76, an input of the OR gate 69, an input of an OR gate 77, an input of an OR gate 78, an input of an OR gate 79 and an input of an OR gate 81. The input terminal 25 is connected to the other input of the OR gate 76. The output of the inhibit gate 72 is connected to the other input of the OR gate 77. The output of the AND gate 73 is connected to the other input of the OR gate 78. The output of the inhibit gate 74 is connected to the other input of the OR gate 79. The output of the inhibit gate 75 is connected to the other input of the OR gate 81. The output of the OR gate 76 is connected to the other input of the flip-flop 35. The output of the OR gate 69 is connected to the other input of the flip-flop 36. The output of the OR gate 77 is connected to the other input of the flip-flop 37. The output of the OR gate 78 is connected to the other input of the flip-flop 38. The output of the OR gate 79 is connected to the other input of the flip-flop 39. The output of the OR gate 81 is connected to the other input of the flip-flop 41.

The piecewise linear coder of known type, described with reference to FIGS. 1 and 2, has a number of defects. The logical circuit, as shown in FIG. 2, is complex and complicated. The number of pieces is increased and the degree of approximation is increased, the logical circuit becomes complicated and the number of components increases rapidly. The only piecewise linear characteristics which may be realized are those wherein the number of digits for determining break points and the number of digits for dividing the linear region are fixed and the logical circuit corresponding to the digits is fixed in advance. If the piecewise linear characteristics are modified, it is necessary to redesign the resistance values for providing the break points in the range of variation of the amount of attenuation that may be realized by the attenuator 18 of FIG. 1.

The defects of the known types of coders, including the aforedescribed defects, are eliminated by the nonlinear coder of the present invention. FIG. 3 illustrates an embodiment of the nonlinear coder or encoder of the present invention. In FIG. 3, an input terminal 91 is connected to the input of an amplifier 92. The output of the amplifier 92 is connected in common to the input of a full wave rectifier 93 and the input of a first comparator 94. The output of the full wave rectifier 93 is connected to the input of a storage 95. The output of the storage 95 is connected to the input of a second comparator 96.

The output of the first comparator 94 is connected to an input of an AND gate 97. An input terminal 98 is connected to the other input of the AND gate 97. The output of the AND gate 97 is connected to an input of an AND gate 99. An output terminal 101 is connected to the output of the AND gate 99. The output of the second comparator 96 is connected to the other input of the AND gate 99. The AND gates 97 and 99 function as the output of the encoder of FIG. 3.

The output of the second comparator 96 is also connected to the input of a control circuit 102. A pair of input terminals 103 and 104 are connected to the control circuit 102. The output of the control circuit 102 is connected to a reversible shift register 105. The outputs of the reversible shift register 105 are connected to the inputs of a gate and memory circuit 106. The outputs of the gate and memory circuit 106 are connected to the inputs of a linear resistance network 107. The gate and memory circuit 106 is connected to the control circuit 102. The output of the linear resistance network 107 is connected to the input of the second comparator 96 at a common point in the connection between the storage 95 and the second comparator. A time or clock signal D1 is supplied to the input terminal 98 to switch the AND gate 97 to its conductive condition.

Input signals supplied to the input terminal 91 are amplified by the amplifier 92 having a determined amplification factor. The sign or polarity of the input signals is discriminated or determined by the first comparator 94, which functions as a sign discriminating circuit. Thus, for example, if the input signals have a positive sign or polarity, the first comparator 94 may produce a PCM pulse. The PCM pulse is transferred through the AND gates 97 and 99 and is provided at the output terminal 101 as an output signal.

The amplified input signals are rectified by the full wave rectifier 93 and are converted into positive signals, for example. The positive, amplified, rectified signals are stored in the storage 95. The signals stored in the storage 95 are supplied to the second comparator 96 where they are compared with a signal having a comparison level which is provided by the linear resistance network 107 and is also supplied to the said second comparator. If the signals from the storage 95 are greater in magnitude than the comparison level of the comparison level signal, a PCM pulse may be provided, for example. The PCM pulse is transferred through the AND gate 99 an is provided as an output signal at the output terminal 101.

The control circuit 102 is controlled in accordance with the output of the second comparator 96. That is, the control circuit 102 is controlled in accordance with the control signal or PCM pulse provided by the second comparator 96. The control circuit 102 controls the forward or backward operation of the reversible shift register 105. The forward and backward operation of the reversible shift register 105 controls the gate and memory circuit 106, which drives the linear resistance network 107 and thereby produces a suitable comparison signal.

The 13-piece linear characteristic CF13 of FIG. 4 is explained with reference to the encoder of FIG. 3. FIG. 4 illustrates a piecewise linear characteristic diagram for the logarithmic compression of input signals. In FIG. 4, the abscissa represents input signal levels and the ordinate indicates output signal levels or output code levels. In the characteristic of FIG. 4, the greater the number of break points, the greater the accuracy of the approximation of the logarithmic curves. The circuit structure, however, also increases in complexity. In FIG. 4, CF5 is a 5-piece linear characteristic, CF7 if a 7-piece linear characteristic, CF13 is a 13-piece linear characteristic, CF29 is a 29-piece linear characteristic, and S1, S2,... are break points.

FIG. 5a represents the linear resistance network 107 of the encoder of the present invention, as shown in FIG. 3. FIGS. 5b and 5c illustrate a method of operating the reversible shift register 105, in accordance with the present invention, for a 13-piece linear characteristic. The resistance value of the linear resistance network 107 of FIG. 5a is determined so that signals are produced with magnitudes equal to ½, $(½)^2$, $(½)^3$, ... $(½)^{10}$ of the maximum signal level.

First a comparison signal having a magnitude or level to the fourth power, which is $(½)^4$ or 1/16, is produced in the second digit. This comparison signal is compared in level with the signal level. If the signal level is greater, a comparison signal to the second power is produced, which comparison signal is $(½)^2$ or ¼. The second comparison signal is produced by the decoder or linear resistance network in the third digit. If the signal level is less than the level of the comparison signal, a comparison signal to the sixth power is produced, which comparison signal is $(½)^6$ or 1/64.

After the foregoing operations, the break points are selected in a similar manner until the fourth digit is reached. The break point level produced in the fourth digit is compared with the signal level. If the signal level is greater in magnitude, this indicates that said signal level is between the break point level and a level or magnitude equal to a multiple of said break point level. The break point level is therefore stored and the upper piecewise linear region of the break point is linearly divided in the remaining digit. If, on the other hand, the signal level is less than the break point level, this indicates that said signal level is between said break point level and break point level which is ½ said break point level. In such case, the break point level is redetermined and the lower region is redivided linearly with the remaining digit, utilizing the ½ break point level as the base. This may be accomplished with facility by simply operating the reversible shift register due to the utilization of the linear resistance network.

FIG. 6 is a circuit diagram of the components 102, 105, 106 and 107 of the encoder of FIG. 3. As shown in FIG. 6, the linear resistance network 107 comprises three types of resistors, 2r, r and mr, for determining break points, and three types of resistors, mr, 2mr and 4mr for dividing the linear region.

The reversible shift register 105 comprises a plurality of flip-flops 111a, 111b, 111c, 111d, 111e, 111f, 111g, 111h, 111i and 111j, which operate as indicated by the arrows. The flip-flops 111 to 117 of the reversible shift register 105 also function as a memory circuit. Digit timing or clock pulses D1, D5, D6, D7 and D8 are supplied to input terminals 118, 119a and 119b, 121a and 121b, 122 and 123a and 123b, respectively. A source of positive DC voltage +E provides operating power. The clock pulse D1 is a set input and the clock pulse D8 is a reset input. A bit pulse B is supplied via input terminals 124a and 124b.

The operation of the linear resistance network 107 is controlled by a plurality of diodes 125a to 125g, 126a to 126g, 127a to 127g and 128a to 128g. The diodes 127a and 128a are connected back to back in series circuit arrangement with each other and with resistor 129a. The diodes 127b and 128c are connected back to back in series circuit arrangement with each other and with a resistor 129b. The diodes 127c and 128c are connected back to back in series circuit arrangement with each other and with a resistor 129c. The diodes 127d and 128d are connected back to back in series circuit arrangement with each other and with a resistor 129d. The diodes 127e and 128e are connected back to back in series circuit arrangement with each other and with a resistor 129e. The diodes 127f and 128f are connected back in series circuit arrangement with each other and with a resistor 129f. . The diodes 127g and 128g are connected back to back in series circuit arrangement with each other and with a resistor 129g.

The diodes 125a and 126a are connected back to back in series circuit arrangement. The diodes 125b and 126b are connected back to back in series circuit arrangement. The diodes 125c and 126c are connected back to back in series circuit arrangement. The diodes 125d and 126d are connected back to back in series circuit arrangement. The diodes 125e and 126e are connected back to back in series circuit arrangement. The diodes 125f and 126f are connected back to back in series circuit arrangement. The diodes 125g and 126are connected back to back in series circuit arrangement with a resistor 129h. The output of the flip-flop 111a is connected in common to a corresponding end of each of the series circuit arrangements 127g, 128g and 125g, 126g, 129h. The output of the flip-flop 111b is connected in common to a corresponding end of each of the series circuit arrangements 127f, 128f, 129f, and 125f, 126f. The output of the flip-flop 111c is connected in common to a corresponding end of each of the series circuit arrangements 127e, 128e, 129e and 125e, 126e. The output of the flip-flop 111d is connected in common to a corresponding end of each of the series circuit arrangements 127d, 128d, 129d and 125d, 126d. The output of the flip-flop 111e is connected in common to a corresponding end of each of the series connected arrangements 127c, 128c, 129c and 125c, 126c. The output of the flip-flop 111f is connected in common to a corresponding end of each of the series circuit arrangements 127b, 128b, 129 b and 125b. The output of the flip-flop 111g is connected in common to a corresponding end of each of the series circuit arrangements 127a, 128a, 129a and 125a, 126a.

The output of the flip-flop 111h is connected to a pair of diodes 131a and 132a, connected back to back in series circuit arrangement. The output of the flip-flop 111i is connected to a pair of diodes 131b and 132b, connected back to back in series circuit arrangement. The output of the flip-flop 111j is connected to a pair of diodes 131c and 132c, connected back to back in series circuit arrangement. The ends of the series circuit arrangements 131a, 132a and 131b, 132b, and 131c, 132c are connected in common to a lead 133.

A common point in the connection between the diodes 127a and 128a is directly connected to the lead 133. A common point in the connection between the diodes 127b and 128b is directly connected to the lead 133. A common point in the connection between the diodes 127c and 128c is directly connected to the lead 133. A common point between the diodes 127d and 128d is directly connected to the lead 133. A common point in the connection between the diodes 127e and 128e is directly connected to the lead 133. A common point in the connection between the diodes 127f and 128f is directly connected to the lead 133. A common point in the connection between the diodes 127g and 128g is directly connected to the lead 133.

A common point in the connection between the diodes 125a and 126a is connected to a lead 134 via a resistor 135a. A common point in the connection between the diodes 125b and 126b is connected to the lead 134 via a resistor 135b. A common point in the connection between the diodes 125c and 126c. is connected to the lead 134 via a resistor 135c. A common point in the connection between the diodes 125d and 126d is connected to the lead 134 via a resistor 135d. A common point in the connection between the diodes 125e and 126e is connected to the lead 134 via a resistor 135e. A common point in the connection between the diodes 125f and 126f is connected to the lead 134 via a resistor 135f. A common point between the diodes 125g and 126g is connected to the lead 134 via a resistor 135g.

The source of voltage $\pm E$ is connected to the lead 134. Each of the resistors 129a to 129f has a resistance value of $2r$ Each of the resistors 135a to 135g has a resistance value of $mr$. A resistor 136a is connected between a common point in the connection between the resistor 129a and the diode 127a and a common point in the connection between the resistor 129b and the diode 127b. A resistor 136b is connected between a common point in the connection between the resistor 129b and the diode 127b and a common point in the connection between the resistor 129c and the diode 127c. A resistor 136c is connected between a common point in the connection between the resistor 129c and the diode 127c and a common point in the connection between the resistor 129d and the diode 127d. A resistor 136d is connected between a common point in the connection between the resistor 129d and the diode 127d and a common point in the connection between the resistor 129e and the diode 127e. A resistor 136e is connected between a common point in the connection between the resistor 129e and the diode 127e and a common point in the connection between the resistor 129f and the diode 127f. A resistor 136f is connected between a common point in the connection between the resistor 129f and the diode 127f and a common point in the connection between the resistor 129g and the diode 127g. A resistor 136g is connected between a common point in the connection between the resistor 129g and the diode 127g and the resistor 129h and the diode 125g. A resistor 136h is connected between a common point in the connection between the resistor 129h and the diode 125g and the other input to the second comparator 96.

The ends of the resistors 129a to 129h opposite those which are connected to the corresponding ones of the diodes 127a to 127g and 125a to 125g are connected in common to a lead 137. A common point in the connection between the diodes 131a and 132a is connected to the lead 134 via a resistor 138. A common point in the connection between the diodes 131b and 132b is connected to the lead 134 via a resistor 139. A common point in the connection between the diodes 131c and 132c is connected to the lead 134 via a resistor 141. The resistor 138 has a resistance value $mr$. The resistor 139 has a resistance value $2mr$. The resistor 141 has a resistance value $4mr$.

The input terminal 119a is connected to an input of the flip-flop 111h. The input terminal 119b is connected to an input of an AND gate 142. The input terminal 121a is connected in common to an input of the flip-flop 111i and an input of an inhibitor 143. The input terminal 121b is connected to an input of a flip-flop 111k.

The input terminal 122 is connected in common to an input of the flip-flop 111j and an input of an inhibitor 144. The input terminal 123a is connected to an input of the flip-flop 111d. The input terminal 118 is connected to another input of the flip-flop 111d. The input terminal 123b is connected to another input of the flip-flop 111k. The input terminal 124b is connected in common to an input of an AND gate 145 and to an input of an inhibit gate or inhibitor 146.

The output of the second comparator 96 is connected in common, via a lead 147, to the other input of the AND gate 142, another input of the inhibitor 146, another input of the AND gate 145, the other input of the inhibitor 143 and the other input of the inhibitor 144. The output of the flip-flop 111k is connected in common to the third input of the AND gate 145 and a third input of the inhibitor 146.

The output of the AND gate 142 is connected to the fourth input of the inhibit gate 146. The output of the inhibit gate 146 is connected in common to a input of each of the flip-flops 111a, 111b, 111c, 111d, 111e, 111f, 111g, and 111j, via a lead 148. The output of the AND gate is connected in common to another input of each of the flip-flops 111a, 111b, 111d, and 111f, via a lead 149. A common lead 151 connects another input of the flip-flops 111a, 111b, 111c, 111e, 111f, and 111g to each other.

The output of the inhibit gate 143 is connected to an input of the OR gate 152. The output of the AND gate 146 is connected to the other input of the OR gate 152. The output of the inhibit gate 144 is connected to an input of an OR gate 153. The output of the AND gate 146 is connected to the other input of the OR gate 153. The output of the OR gate 152 is connected to the other input of the flip-flop 111h. The output of the OR gate 153 is connected to the other input of the flip-flop 111i.

When a flip-flop of FIG. 6 is in its reset condition, the corresponding one of the diodes 126a to 126g is switched to its conductive condition and the corresponding one of the diodes 125a to 125g is switched to its nonconductive condition. When the flip-flop is in its set condition, the corresponding one of the diodes 126a to 126g is switched to its nonconductive condition and the corresponding one of the diodes 125a to 125g is switched to its conductive condition. The weighing resistors 136a to 136h, 129h, to 129h, 135a to 135g and 138 are thus connected into the circuit and a voltage is applied to the second comparator 96 via said resistors.

When a flip-flop is in its set condition and one of the flip-flops 111h to 111j for dividing the linear region is in its set condition, the corresponding one of the diodes 127a to 127g is switched to its conductive condition. When such diode is in its conductive condition, it indicates that the first resistor for dividing the linear region is connected in the circuit.

The embodiment of the present invention of FIG. 3 and 6 may provide logarithmic compression. In such case, the linear region dividing point, as shown in FIG. 4, is available by adding the break point level to a level which is equal to ½ of such level. Thus, for example, if the break point is S2, corresponding to ¼ in FIG. 4, the first linear region dividing point is at the intermost point between ¼ and ½, which is, more specifically, ⅜. This means that ⅛, which is ½ of ¼, is added to the break point level of ¼. This is realized by the circuitry of FIG. 6, and especially that portion of the circuitry which includes the diodes 127a to 127g.

In the control circuit 102, as shown in FIG. 6, shift pulses in the backward direction are transferred by the AND gate 145 and shift pulses in the forward direction are transferred by the inhibit gate 146. A set signal D8 for the flip-flop 111k is supplied to the input terminal 123b of the control circuit 102 and a reset signal D6 is supplied to the input terminal 121b of said control circuit. The flip-flop 111k functions to control the operation of the AND gate 145 and the inhibit gate 146, and switches such gates to their conductive condition only when the reversible shift register is required to shift in its operation, per D3, D4, D5. The flip-flop 111k functions to switch the AND gate 145 and the inhibit gate 146 to their nonconductive condition, when the piecewise linear region is divided per D5, D6, D7. The digit timing pulse D5 is utilized simultaneously for providing both the break points and the dividing of the linear region. The inhibitor 146 prevents the AND gate 145 from shifting, so that the break point level may be set at ½ when the level of the rectified signal is greater than ½.

Signals rectified by the full wave rectifier 93 of FIG. 3 are compared in the second comparator 96 with the comparison level (½) [4] produced by the control of the switch of the linear resistance network 107 by the flip-flop 111d of FIG. 6, in the first digit. The comparison result provided by the second comparator 96 is transferred in the time slot of the D3 digit. If the signal level is greater, a signal 1 is provided and, in the control circuit 102, the flip-flop 111k switches the AND gate 145 to its conductive condition. The information transmitted from the control circuit 102 operates the reversible shift register 105 in the direction of the arrows pointing to the right in FIG. 6. If the signal level is less, the inhibit gate 146 is switched to its conductive condition and information is transmitted from the control circuit 102 which operates the reversible shift register 105 in the direction of the arrows pointing to the left in FIG. 6.

The reversible shift register comprises the flip-flops 111a to 111g of FIG. 6, which are connected as shown in said FIG. and which correspond to the piecewise linear characteristic which is to be realized. Therefore, each time a shift pulse is provided by the AND gate 145 or the inhibit gate 146 of the control circuit 102, of FIG. 6, the break point levels S1, S2, S3..., as shown in FIG. 4, are selected, so that the desired polygonal line characteristic may be realized.

If the linear region which is to be divided is finally determined in the D5 digit, the gates 145 and 146 are switched to their nonconductive condition by the control flip-flop 111k of the control circuit 102, after the timing pulse D6. The flip-flops 111a to 111g of the reversible shift register 105 then maintain the last break point level. The flip-flops 111h 111i and 111j of FIG. 6 are utilized to divide the linear region of the determined polygonal line during the remaining three bits. This operation is completely similar to that of an ordinary feedback type linear coder. Finally, after coding in one channel is completed and the seventh digit is transmitted in the aforedescribed manner, the flip-flops are reset by the eighth or ninth digit and the system is prepared for the succeeding operation.

FIG. 7 is a circuit diagram of a reversible shift register which may be utilized as the reversible shift register 105 of FIG. 3. Although only 3 stages of the shift register are illustrated in FIG. 7, the complete shift register may be realized by extending the circuit of FIG. 7. In FIG. 7, a common lead 161 extends between terminals 162 and 163. A common lead 164 extends between terminals 165 and 166. The lead 161 is connected in common to an input of an AND gate 167, an input of an AND gate 168, an input of an AND gate 169, an input of an AND gate 171, an input of an AND gate 172 and an input of an AND gate 173. The lead 164 is connected in common to an input of an AND gate 174, an input of an AND gate 175, an input of an AND gate 176, an input of an AND gate 177, and an input of an AND gate 178 and an input of an AND gate 179. Shift pulses for shifting the shift register in the forward direction are supplied to the input terminal 163. Shift pulses for shifting the shift register in the backward direction are supplied to the input terminal 166.

The output of the AND gate 177 and a terminal 181 are connected in common to an input of a flip-flop 182. The output of the AND gate 179 and the output of the AND gate 168 are connected in common to an input of a flip-flop 183. The output of the AND gate 167 and the output of the AND gate 178 are connected in common to the other input of the flip-flop 183. The output of the AND gate 171 and a terminal 184 are connected in common to an input of a flip-flop 185. A terminal 186 and the output of the AND gate 176 are connected in common to the other input of the flip-flop 182. The output of the AND gate 169 and a terminal 187 are connected in common to the other input of the flip-flop 185.

The output of the AND gate 172 is connected to a terminal 188. The output of the AND gate 173 is connected to a terminal 189. An output of the flip-flop 182 is connected in common to the other input of each of the AND gates 167 and 174. The other output of the flip-flop 182 is connected in common to the other input of each of the AND gates 168 and 175. The output of the AND gate 175 is connected to a terminal 191. An output of the flip-flop 183 is connected in common to the other input of each of the AND gates 169 and 176.

The other output of the flip-flop 183 is connected in common to the other input of each of the AND gates 171 and 177. An output of the flip-flop 185 is connected in common to the other input of each of the AND gates 172 and 178. The other output of the flip-flop 185 is connected in common to the other input of each of the AND gates 173 and 179.

The aforedescribed encoder of the present invention may be utilized not only with a 13 piece linear characteristic, but also with various other piecewise linear characteristics. The encoder of the present invention is applicable not only to approximation with logarithmic curves, but also to piecewise linear approximation to various other curves. FIG. 5c illustrates a method of operating a shift register to approximate a logarithmic curve with seven polygonal lines. FIG. 8 illustrates a compression curve which is an example of hyperbolic compression.

FIG. 8 is a polygonal line characteristic diagram similar to FIG. 4. In FIG. 8, CV5 illustrates 5 polygonal lines, CV7 illustrates 7 polygonal lines, CV9 illustrates nine polygonal lines and CV11 illustrates 11 polygonal lines. The digits for determining the break points are not fixed, but are different depending upon the levels of the signals. in FIG. 8, as in FIG. 4, the abscissa represents the input signal level, indicated as 1/10, ⅛, ¼, ½, and the ordinate represents the output signal level, indicated as ¼, ½, ¾.

If a comparison signal having a magnitude or level corresponding to a break point S1 is provided in the second digit, and the signal stored in the storage 95 (FIG. 3) is greater in magnitude, a level corresponding to the break point S2 is provided in the third digit. If the signal stored in the storage 95 is smaller than the comparison level of the level corresponding to the break point S1, the remaining digits are all utilized for dividing the linear region, that is, for linear coding. If the signal stored by the storage 95 (FIG. 3) is greater in magnitude or level than the comparison level of a comparison signal corresponding to the break point S2 in the third digit, a level corresponding to the break point S3 is provided in the fourth digit. If the magnitude or level of the signal stored in the storage 95 is less than the corresponding level, the remaining digits are utilized for dividing the linear region.

Polygonal line compression may be performed in the aforedescribed manner in the case of FIG. 8. However, such operation may be accomplished with facility by operating the shift register in the directions illustrated in FIGS. 9a, 9b and 9c. FIG. 9a is similar to FIG. 5a, , FIG. 9b is similar to FIG. 5b, and FIG. 9c is similar to FIG. 5c. The difference between FIGS. 9b and 9c and 5b and 5c is that FIG. 9b illustrates a hyperbolic nine piece linear characteristic and FIG. 9c illustrates a hyperbolic five piece linear characteristic.

FIG. 10 illustrates an embodiment of the nonlinear coder of the present invention for hyperbolic compression. The circuit of FIG. 10 comprises a gate and memory circuit 106', a reversible shift register 105′, a control circuit 102′, the second comparator 96 and the linear resistance network 107. The reversible shift register comprises a plurality of flip-flops 195a, 195b, 195c, 195d, 195e, 195f, 195g, 195h, interconnected as indicated, in a manner generally similar to that of the reversible shift register 105 of FIG. 6. The gate and memory circuit 106′ comprises a plurality of flip-flops 196a, 196b, 196c, 196d, 196e, 196f, 196g and 196h. The output of each of the flip-flops 196a to 196h is connected to a corresponding input of the linear resistance network 107. An input terminal 197, to which a clock pulse D8 is supplied, is connected in common, via a common lead 198, to an input of each of the flip-flops 195a, 195b, 195c, 195d, 195e, 195f and 195g of the reversible shift register 105′, an input of the flip-flop 196a, an input of the flip-flop 196h, an input of an OR gate 199, an input of an OR gate 201, an input of an OR gate 202, an input of an OR gate 203, an input of an OR gate 204 and an input of an OR gate 205.

The output of the flip-flop 195a is connected in common to the other input of the flip-flop 196a and an input of an inhibit gate 206. The output of the flip-flop 195b is connected in common to an input of the flip-flop 196b and an input of an inhibit gate 207. The output of the flip-flop 195c is connected in common to an input of the flip-flop 196c and an input of an AND gate 208. The output of the flip-flop 195d is connected in common to an input of an AND gate 209, an input of an AND gate 211 and an input of an OR gate 212. The output of the flip-flop 195e is connected in common to an input of an OR gate 213, an input of an AND gate 214 and an input of an AND gate 215. The output of the flip-flop 195f is connected in common to an input of an AND gate 216 and an input of an AND gate 217. The output of the flip-flop 195g is connected in common to an input of an AND gate 218 and an input of an AND gate 219. The output of the flip-flop 195h is connected to an input of an AND gate 221.

The output of the second comparator 96 is connected in common to the input of an inverter 222, the input of an inhibit gate 223, the input of an inhibit gate 224, another input of the AND gate 217, the other input of the AND gate 215, the other input of the inhibit gate 212, an input of an inhibit gate 225, the other input of the inhibit gate 207 and the other input of the inhibit gate 206. The other input of the inhibit gate 225 is connected to the output of the flip-flop 195c. The clock pulse D8 is also supplied to an input terminal 226 which is connected to an input of a flip-flop 227. The output of the inverter 222 is connected to an input of an AND gate 228. The output of the AND gate 228 is connected to the other input of the flip-flop 227. The output of the flip-flop 227 is connected in common to another input of the AND gate 223, an input of an inhibit gate 229, an input of an AND gate 231, the third input of the AND gate 217, an input of an and gate 323, an input of an AND gate 233 and an input of an AND gate 234. The output of the flip-flop 227 is connected to the AND gates 321, 217, 232, 233 and 234 via a delay circuit 235. The delay circuit 235 provides a one bit delay.

The output of the flip-flop 227 is also connected, via a differential circuit 236, to an input of an inhibit gate 237 and another input of the inhibit gate 224. An input terminal 238 supplies a clock pulse +D3 to the other input of the inhibit gate 237. The output of the inhibit gate 237 is connected in common to the other input of the AND gate 219, to an input of an AND gate 239, to the other input of the AND gate 214, to the other input of the AND gate 211 and to the other input of the AND gate 208. The output of the flip-flop 195f is connected to the other input of the AND gate 239. A pulse +B1 is supplied to an input terminal 241 which is connected in common to the third input of the inhibitor 223, the third input of the inhibitor 224 and an input of the inhibitor 229. The output of the inhibitor 229 is connected in common to an input of each of the flip-flops 195a, 195b, 195c, 195d, 195f, 195g and 195h.

The output of the inhibit gate 224 is connected in common to the other input of the flip-flop 195h, the other input of the flip-flop 195g, the other input of the flip-flop 195f and an input of the flip-flop 195e. The output of the inhibit gate 223 is connected in common to a fourth input of the flip-flop 195f and to a third input of the flip-flop 195e. The output of the inhibit gate 206 is connected to the other input of the OR gate 199. The output of the OR gate 199 is connected to the other input of the flip-flop 196b. The output of the inhibit gate 207 is connected to the other input of the OR gate 201. The output of the OR gate 201 is connected to the other input of the flip-flop 196c. The output of the inhibit gate 225 is connected to the other input of the OR gate 202. The output of the OR gate 202 is connected to an input of the flip-flop 196d. The output of the AND gate 208 is connected to the other input of the AND gate 209. The output of the AND gate 209 is connected to the other input of the flip-flop 106c.

The output of the AND gate 211 is connected to the other input of the OR gate 213. The output of the OR gate 213 is connected in common to the other input of the AND gate 234 and to an input of an OR gate 242. The output of the AND gate 214 is connected to the other input of the AND gate 216. The output of the AND gate 216 is connected in common to the other input of the AND gate 233 and an input of an OR gate 243. The output of the AND gate 239 is connected to the other input of the AND gate 218. The output of the AND gate 218 is connected in common to the other input of the AND gate 232 and to another input of the OR gate 244. The output of the AND gate 219 is connected to the other input of the AND gate 221. The output of the AND gate 221 is connected in common to the other input of the AND gate 231 and an input of an OR gate 245.

The output of the inhibit gate 212 is connected to the other input of the OR gate 203. The output of the AND gate 215 is connected to the other input of the OR gate 204. The output of the AND gate 217 is connected to the other input of the OR gate 205. The output of the AND gate 234 is connected to an input of the flip-flop 196e. The output of the OR gate 203 is connected to the other input of the flip-flop 196e. The output of the AND gate 233 is connected to an input of the flip-flop 196f. The output of the OR gate 204 is connected to the other input of the flip-flop 196f. The output of the AND gate 234 is connected to an input of the flip-flop 196g. The output of the OR gate 205 is connected to the other input of the flip-flop 196g. The output of the AND gate 231 is connected to the other input of the flip-flop 196h. The output of the flip-flop 196e is connected to the other input of the OR gate 242. The output of the flip-flop 196f is connected to the other input of the OR gate 243. The output of the flip-flop 196g is connected to the other input of the OR gate 244.

The output of the OR gate 242 is connected to the corresponding input of the linear resistance network 107. The output of the OR gate 243 is connected to the corresponding input of the linear resistance network 107. The output of the OR gate 244 is connected to the corresponding input of the linear resistance network 107. The output of the OR gate 245 is connected to the corresponding input of the linear resistance network 107. The output of the flip-flop 196h is connected in common to the other input of the OR gate 245, the other input of the AND gate 228 and the third input of the inhibit gate 229 via a delay circuit 246 and a differential circuit 247 connected in series circuit arrangement with said delay circuit.

The described nonlinear coder or encoder of the present invention has the following advantageous features. Various companding characteristics may be provided by utilizing a simple linear resistance network 107. A simple circuit is utilized to provide logarithmic type polygonal line compression and hyperbolic type polygonal line compression. The circuit utilized comprises a reversible shift register connected in a feedback circuit. It is very difficult to provide hyperbolic type polygonal line compression with known encoders and it is impossible to provide logarithmic type polygonal line compression with known encoders. It is impossible to vary the polygonal line characteristic with facility in known line encoders. In the encoder of the present invention, however, the polygonal line characteristics may be varied freely with facility and simplicity.

While the invention has been described by means of specific examples and in specific embodiments, we do not wish to be limited thereto, for obvious modifications will occur to those skilled in the art without departing from the spirit and the scope of the invention.

We claim:

1. A nonlinear coder for piecewise linear compression encoding of input signals, comprising:
   input means for providing input signals;
   sign discriminating means connected to said input means for determining the sign of said input signals;
   full wave rectifying means connected to said input means for rectifying said input signals;
   network means for providing a comparison level signal;
   gate and memory means connected to said network means for driving said network means;
   comparing means;
   coupling means coupled between said network means and said rectifying means and said comparing means for supplying the rectified signals and the comparison level signal to said comparing means, said comparing means comparing the level of said rectified signals with said comparison level;
   control means connected to said comparing means for providing a control signal in accordance with the output of said comparing means;
   reversible shift register means connected between said control means and said gate and memory means for controlling said gate and memory means in accordance with said control signal; and
   output means coupled to said sign discriminating means and said comparing means for providing an output pulse.

2. A nonlinear coder as claimed in claim 1, wherein said sign discriminating means comprises a first comparator and said comparing means comprises a second comparator.

3. A nonlinear coder as claimed in claim 1, wherein said network means comprises a linear resistance network.

4. A nonlinear coder as claimed in claim 1, wherein said output means comprises a pair of AND gates, one of said AND gates having an input connected to said comparing means and another input coupled to said sign discriminating means via the other of said AND gates.

5. A nonlinear coder as claimed in claim 1, wherein said control means controls said reversible shift register means for logarithmic compression.

6. A nonlinear coder as claimed in claim 1, wherein said control means controls said reversible shift register means for hyperbolic compression.

7. A nonlinear coder as claimed in claim 4, wherein said network means comprises a linear resistance network, said sign discriminating means comprises a first comparator and said comparing means comprises a second comparator.

PO-1050
(5/69)

UNITED STATES PATENT OFFICE
CERTIFICATE OF CORRECTION

Patent No. 3,573,802      Dated April 6, 1971

Inventor(s) MASAO KAWASHIMA et al

It is certified that error appears in the above-identified patent and that said Letters Patent are hereby corrected as shown below:

In the heading the German priority number should read as follows: --43-15295--

Signed and sealed this 31st day of August 1971.

(SEAL)
Attest:

EDWARD M. FLETCHER, JR.
Attesting Officer

ROBERT GOTTSCHALK
Acting Commissioner of Paten

PO-1050
(5/69)

UNITED STATES PATENT OFFICE
CERTIFICATE OF CORRECTION

Patent No. 3,573,802            Dated April 6, 1971

Inventor(s) MASAO KAWASHIMA et al

It is certified that error appears in the above-identified patent and that said Letters Patent are hereby corrected as shown below:

In the heading the Japanese priority number should read as follows: --43-15295--

This certificate supersedes Certificate of Correction issued August 31, 1971.

Signed and sealed this 15th day of February 1972.

(SEAL)
Attest:

EDWARD M. FLETCHER, JR.
Attesting Officer

ROBERT GOTTSCHALK
Commissioner of Patents